US010407346B1

(12) United States Patent
Dimanshteyn et al.

(10) Patent No.: US 10,407,346 B1
(45) Date of Patent: Sep. 10, 2019

(54) NON-FLAMABLE MATERIALS, PRODUCTS, AND METHOD OF MANUFACTURE

(71) Applicants: Felix A Dimanshteyn, West Hartford, CT (US); Adam Dimanshteyn, Unionville, CT (US)

(72) Inventors: Felix A Dimanshteyn, West Hartford, CT (US); Adam Dimanshteyn, Unionville, CT (US)

( * ) Notice: Subject to any disclaimer, the term of this patent is extended or adjusted under 35 U.S.C. 154(b) by 0 days.

(21) Appl. No.: 16/389,511

(22) Filed: Apr. 19, 2019

Related U.S. Application Data

(63) Continuation of application No. 15/477,512, filed on Apr. 3, 2017, now Pat. No. 10,280,118.

(51) Int. Cl.
| | |
|---|---|
| *C04B 28/26* | (2006.01) |
| *C09K 21/02* | (2006.01) |
| *B32B 9/04* | (2006.01) |
| *C04B 111/00* | (2006.01) |
| *C04B 111/28* | (2006.01) |

(52) U.S. Cl.
CPC ............... *C04B 28/26* (2013.01); *B32B 9/04* (2013.01); *C09K 21/02* (2013.01); *C04B 2111/00215* (2013.01); *C04B 2111/28* (2013.01)

(58) Field of Classification Search
None
See application file for complete search history.

(56) References Cited

U.S. PATENT DOCUMENTS

| | | | | |
|---|---|---|---|---|
| 3,466,221 A | * | 9/1969 | McCready | C04B 28/26 106/601 |
| 3,827,869 A | * | 8/1974 | von Bonin | C04B 16/04 65/22 |
| 4,909,845 A | * | 3/1990 | Ray | C09K 3/1015 106/18.12 |
| 7,744,783 B2 | * | 6/2010 | Dimanshteyn | C04B 28/26 252/606 |
| 2004/0126483 A1 | * | 7/2004 | Heimann | B22D 19/0054 427/58 |
| 2005/0031843 A1 | * | 2/2005 | Robinson | B32B 33/00 428/293.4 |
| 2006/0079612 A1 | * | 4/2006 | Troutman | C09D 5/185 524/99 |
| 2008/0063875 A1 | * | 3/2008 | Robinson | B32B 1/08 428/426 |

* cited by examiner

*Primary Examiner* — Joseph D Anthony
(74) *Attorney, Agent, or Firm* — Robert S. Smith

(57) ABSTRACT

A composition of matter as well as a protective coating or article manufactured from the composition produced by preparing a non-flammable mixture by mixing (I) at least one water-soluble alkali metal silicate selected from the group consisting of sodium silicate, potassium silicate, and combinations thereof; (II) sodium aluminosilicate, which, in the process of interacting with a soluble alkali metal silicate under heat and/or fire, substantially expands and produces foam, which provides heat/fire protection for surfaces, (III) at least one chemical selected from the group consisting of silica, mica, talc, microspheres, glass, ceramic, chopped fibers, plaster of Paris, sodium bicarbonate, cement, perlite, zinc oxide, zeolite, wollastonite, vermiculate, clay, borax and alumina, which, in the process of interacting with a soluble alkali metal silicate and sodium aluminosilicate, accelerates the processes of interaction and improves the mechanical, physical and thermal properties including providing stability of the mixture.

3 Claims, No Drawings

NON-FLAMABLE MATERIALS, PRODUCTS, AND METHOD OF MANUFACTURE

CROSS-REFERENCE TO RELATED APPLICATIONS

This application is a continuation of U.S. patent application Ser. No. 15/477,512 filed Apr. 3, 2017 that has matured into U.S. Pat. No. 10,280,118. That Application is hereby incorporated herein by reference in its entirety.

BACKGROUND OF THE INVENTION

The present invention is directed to non-flammable materials such as thermal insulation, thermal barriers, which include but not limited to foam, panels, sheets, and methods of making these non-flammable materials from water-soluble alkali metal silicates and fillers.

Thermal insulation is known for use in houses, buildings, pipes, ductwork, and many other applications. The best-known thermal insulation is fiberglass insulation, sold commercially by, for example, Owens Corning (Toledo, Ohio) and Johns Manville. Although this thermal insulation is very popular, it possesses a relatively low "R" value and reduced thermal insulating properties as it absorbs moisture.

There are several different types of petroleum-based foam such as polyurethane and polystyrene. Polyurethane and other petroleum-based foams have been used for many years and have substantially better R-value as compared to fiberglass insulation. However, petroleum-based foams have several disadvantages. First, they are flammable and can give off toxic fumes if burned. Second, since they are made from petroleum products, such materials are generally bad for the environment if they are not disposed of properly.

U.S. Pat. No. 5,035,951 relates to coatings useful for protecting materials against the effects of overheating. More particularly, the patent relates to intumescent coatings which, when exposed to flame temperatures, provide heat absorptive and insulative thermal barriers. The patent discloses an aqueous mixture of a water-soluble alkali metal silicate, a hydrated metal silicate clay, and an inorganic particulate material which, when exposed to flame temperatures, endothermically releases a nonflammable gas. The sodium and potassium silicates utilized in this coating have softening points of 1200 and 1280° F., and flow points of 1545 and 1660° F., respectively. This composition utilizes clay and other materials that give the composition the ability to withstand temperatures up to 3200-3400° F.

There is a need for foam insulation that possesses a high "R" value and which is nontoxic, nonflammable, and that is not detrimental to the environment. The present invention is believed to be an answer to that need.

U.S. Pat. No. 7,744,783 describes methods of preparing a non-flammable thermal insulation foam, comprising the steps of (a) providing a mixture comprising (1) at least one water-soluble alkali metal silicate, (2) at least one filler, and (3) at least one inorganic material which releases non-flammable gases when exposed to heat; and (b) applying the mixture to a support or mold; and (c) heating the mixture to form the non-flammable thermal insulation foam.

From the above, it is therefore seen that there exists a need in the art to overcome the deficiencies and limitations described herein and above.

SUMMARY OF THE INVENTION

One embodiment of the present invention is directed to a method of preparing non-flammable thermal insulation coating comprising the steps of (a) providing a mixture comprising (1) at least one water-soluble alkali metal silicate, (2) sodium aluminosilicate (3), at least one filler; (b) placing these chemicals in spraying equipment, where they will be mixed, and then applying the mixture on the surface, providing insulation and heat/fire protection for the surface. In another embodiment, the present invention is directed to a method of preparing non-flammable thermal insulation foam and panels at room temperature resulting in a panel that expands and produces insulating foam in presence of heat/fire.

An embodiment of the present invention includes the method of manufacturing a fire-resistant insulating panel at room temperature resulting in a panel that expands and produces insulating foam in presence of heat/fire comprising mixing at room temperature (I) at least one water-soluble alkali metal silicate selected from the group consisting of sodium silicate, potassium silicate, and combinations thereof, (II) at least one chemical selected from the group consisting of silica, mica, talc, microsphere, glass, chopped fibers, sodium aluminosilicate, perlite, zinc oxide, wollastonite, vermiculate, and borax; (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties. The method also includes supporting the mixed ingredients at room temperature with at least one support layer and then placing the one or more support layers with the mixed ingredients between rollers to apply pressure at room temperature to form objects selected from the group consisting of panels, sheets, and planar objects which in event of fire/heat will expand to provide thermal protection.

Similarly in another embodiment the method of manufacturing a fire-resistant insulating panel at room temperature resulting in a panel that expands and produces insulating foam in the presence of heat/fire includes A) mixing at room temperature (I) at least one water-soluble alkali metal silicate selected from the group consisting of sodium silicate, potassium silicate, and combinations thereof; (II) at least one chemical selected from the group consisting of silica, mica, talc, microsphere, glass, chopped fibers, sodium aluminosilicate, perlite, zinc oxide, wollastonite, vermiculate, borax and (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties; followed by supporting the mixed ingredients at room temperature with at least one support layer and C) placing the one or more support layer layers with the mixed ingredients in a mold and applying pressure at room temperature whereby a molded object is formed which in event of fire/heat will expand to provide thermal protection.

Similarly in another embodiment the method of manufacturing a fire-resistant insulating panel at room temperature resulting in a panel that expands and produces insulating foam in the presence of heat/fire includes A) mixing at room temperature (I) at least one water-soluble alkali metal silicate selected from the group consisting of sodium silicate, potassium silicate, and combinations thereof; (II) at least one chemical selected from the group consisting of silica, mica, talc, microsphere, glass, chopped fibers, sodium aluminosilicate, perlite, zinc oxide, wollastonite, vermiculate, borax and (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties; followed by the step of placing the mixed ingredients in a mold and applying pressure at room temperature whereby a molded object is formed which in event of fire/heat will expand to provide thermal protection.

Another embodiment also uses a combination of ingredients selected from the same groups I, II and III in a method of manufacturing a fire-resistant insulating panel at room temperature resulting in a panel that expands and produces insulating foam in the presence of heat/fire followed by placing the mixed ingredients in a mold and applying pressure at room temperature whereby a molded object is formed which in event of fire/heat will expand to provide thermal protection.

In another embodiment, the present invention is directed to a method of forming non-flammable panels, comprising the steps of (a) providing a mixture comprising: (1) at least one water-soluble alkali metal silicate, (2) at least one chemical selected from the group consisting of silica, mica, talc, microspheres, glass, ceramic, chopped fibers, sodium aluminosilicate, cement, perlite, zinc oxide, zeolite, wollastonite, vermiculate, clay, borax and alumina, and (3) at least one chemical which, at room or higher temperatures, interacts with the specific ingredients (1) and (2) to accelerate the interaction processes and create the necessary stability and improved mechanical, physical and thermal properties to produce panels or sheets.

In another embodiment, the present invention is directed to a foam to be used as a non-flammable coating. More specifically, the foam, in the presence of high temperature, for example, in a fire, will be vaporized. More specifically, this embodiment of the present invention and methods of preparing and applying these protective coatings, comprising the steps:

A) preparing a mixture to produce a non-flammable coating comprising:
(I) at least one water-soluble alkali metal silicate selected from the group consisting of sodium silicate, potassium silicate, and combinations thereof.
(II) at least one chemical selected from the group consisting of silica, mica, talc, microspheres, glass, ceramic, chopped fibers, sodium aluminosilicate, cement, perlite, zinc oxide, zeolite, wollastonite, vermiculate, clay, borax, and alumina.
(III) at least one chemical which, at room or elevated temperatures, interacts with chosen ingredients of (I) and (II), creating the necessary stability and acceleration of interaction processes to create improved mechanical, physical and thermal properties in the resultant coating.

D) placing the mixture of (I), (II) and (III) in spraying or other application equipment and then applying the mixture to the surface to be protected. The mixture (I), (II) and (III) in some embodiments is delivered to the sprayer separately. Thus, mixing of the respective ingredients occurs within the spray equipment. In case of high temperature and/or fires, the foam will be vaporized but the coatings will remain intact, resulting in the system having the ability to pass necessary fire and thermal barrier tests, including but not limited to ASTM E 119, FM 4880, NFPA 286, UL 1715.

DETAILED DESCRIPTION

All formulations, materials, and products described in this application are non-flammable. It has been unexpectedly discovered that a non-flammable thermal insulation foam, as well as foamed panels, may be produced from a mixture comprising one or more water-soluble alkali metal silicates and sodium aluminosilicate. The product identified as Zeolex from Huber Engineered Materials may be used as the sodium aluminosilicate. Excellent expansion can be achieved using Zeolex 330. Additional fillers can be added to provide stability of the foam and to improve mechanical, physical and thermal properties. Such formulations respond to heat by substantially expanding to create a foam and can be made into different shapes and forms such as panels and coatings. At room temperatures, these formulations will form in different shapes and forms such as sheets or coatings. These sheets and/or coatings have utility for different applications including but not limited to thermal barriers. In the event of a fire or overheating these sheets will substantially expand to provide fire and thermal protection.

The present invention overcomes many of the deficiencies of prior foam insulation materials because it produces foams having high "R" value and is non-flammable and non-toxic. Additionally, the present invention facilitates producing foams that are not based on petroleum products and thus do not release undesirable gasses when burned and are not hazardous to the environment. In one embodiment, sodium aluminosilicate is utilized in a formulation that also contains water-soluble alkali metal silicates and fillers. This formulation, in the presence of heat such as heat from a fire, substantially expands to provide a foam, foamed panels, and other foamed products.

As fillers, it is possible to use at least one chemical selected from the group comprising silica, mica, talc, microspheres, glass, ceramic, chopped fibers, cement, perlite, zinc oxide, zeolite, wollastonite, vermiculate, clay, borax, alumina, sodium carbonate, sodium bicarbonate, and plaster of Paris.

This formulation has application to several types of products: From this formulation, it is possible to create new types of non-flammable foamed materials having utility for the formation of panels, pipes, sheets, and other forms by utilizing appropriate pressure and/or heat.

This formulation will also allow the creation of new types of thermal barrier materials which can be made in any form and shape such as in panels or sheets as well as in a mold. Such products will provide a thermal barrier without the need for the initial application of additional heat to cause expansion. These thermal barrier products may be made formed with a relatively thin profile. Thereafter, in the event of a fire, these products will be substantially expanded and thus provide thermal barrier protection.

Adding some fillers provides necessary mechanical, physical and thermal properties. By adding some fillers, processes of interaction in the mixture can be changed, including the process of curing. For example, by adding sodium carbonate, sodium bicarbonate, and plaster of Paris, or some type of cement, the curing time of the product can be reduced.

In case of fire or heat, these materials will expand, providing a barrier to heat and fire and the capacity to pass certain heat, fire, and thermal barrier tests, including but not limited to ASTM E-84, ASTM E 119, NFPA 286, UL 1715, UL 1040, and FM 4880.

These materials can be also used as a coating for the protection of different surfaces. These coatings can be sprayed or placed on the surfaces by rollers or by other means. Some ingredients can be delivered to the sprayer separately, where they will be mixed and subsequently sprayed on the surface. When heat and/or fire contacts the coatings, it will expand and provide protection of the surfaces.

In another embodiment, the coating can be used for protection of foam insulation. Under fire, the coating will remain intact and will provide protection, allowing these foams to pass Room corner tests and/or other tests. Some foams can even be vaporized but a coating will remain intact and pass tests. Various types of Styrofoam may be used as insulation foam.

These materials can be also used as a coating for the protection of different surfaces. These coatings can be sprayed or placed on the surfaces by rollers or by other means. Some ingredients can be delivered to the sprayer separately, where they will be mixed and subsequently sprayed on the surface.

In another embodiment it is considering using mixture of (I) water-soluble alkali metal silicate selected from the group consisting of sodium silicate, potassium silicate, and combinations thereof and (II) fillers selected from the group comprising of silica, mica, talc, microspheres, glass, ceramic, chopped fibers, sodium aluminosilicate, cement, perlite, zinc oxide, zeolite, wollastonite, vermiculate, clay, borax and alumina.

To this mixture (I) and (II) can be added (III) chemicals which, at room or elevated temperatures, interact with chosen ingredients, creating the necessary stability, improving mechanical, physical and thermal properties, and accelerating interaction processes in developing panels, coating, foam, sheets. When heat and/or fire contacts the coatings, it will expand and provide protection of the surfaces. Thus, the composition of the present invention may be utilized to make sheets, panels, pipes and/or other form or shape products.

In order to prepare the non-flammable thermal insulation foam, panels, sheets, coatings according to the invention, a mixture is first prepared that contains at least one water-soluble alkali metal silicate. Alkali metal silicates suitable for use in the method of the invention include sodium silicate and potassium silicate. These materials contain varying ratios of alkali metal component to silicon component depending on the grade of the material. The ratio of the alkali metal component to the silicon component also affects the rate at which water is lost from the material.

Preferable sodium silicate materials possess weight ratios of SiO2 to Na2O ranging from 1.6 to 3.75, have composition having percentage by weight ranging from 6.75 to 19.7 weight of Na2O based on the total weight of the silicate, and have weight per cents of $SiO_2$ ranging from 25.3 to 36, based on the total weight of the silicate. An example of suitable sodium silicate for use in the method of the invention is a sodium silicate having a weight ratio of $SiO_2$ to Na2O of 2.40. One such product is sold under the tradename "RU" by PQ Corporation, Valley Forge, Pa. The above water-soluble alkali metal silicates may be used individually in the method of the present invention or may be used in combinations of two or more.

Fillers may be added to improve the physical and thermal properties of the foams and structures made from the foams, such as panels. Useful fillers include silica, including fumed silica and precipitated silica; clays; mica; talc; solid or hollow microspheres; solid or hollow microcells; fillers, such as glass, ceramic, or silica; chopped fibers, cement; vermiculite; perlite, zinc oxide, zeolite, sodium silicofluoride, sulfate salts, and the like. In addition, structural elements, such as metal screens or nonmetal scrims, may also be included in the developed foams materials. As will be appreciated by those of skill in the art, combinations of any of the above filler materials may also be implemented in the method of the invention. The amount of additional fillers used in the mixture according to the method of the invention is preferably from about 1 to about 80 percent by weight, based on the total weight of the mixture, and more preferably from about 20 to about 50%, based on the total weight of the mixture.

The water-soluble alkali metal silicate and the inorganic material are combined using any method that produces a homogeneous mixture, and the resulting mixture can be applied to a substrate in a liquid state or in a partially dry state. For bonding powder or granular materials, a thin silicate film should encapsulate each particle. This requires at least 1-2% of silicate. By pressurizing that mixture, a variety of materials such as panels, sheets, mold shapes can be made. These pressurized materials also can be placed under heat to achieve necessary properties. Materials which can be used for these types of application include but are not limited to vermiculite, perlite, mica, solid or hollow microspheres; solid or hollow microcells.

In another embodiment a mixture is used of (I) water-soluble alkali metal silicate selected from the group consisting of sodium silicate, potassium silicate, and combinations thereof and (II) fillers selected from the group comprising of silica, mica, talc, microspheres, glass, ceramic, chopped fibers, sodium aluminosilicate, cement, perlite, zinc oxide, zeolite, wollastonite, vermiculate, clay, and alumina. To this mixture (I) and (II) can be added (III) chemicals which, at room or elevated temperatures, interact with chosen ingredients, providing the necessary curing process. In the process of curing, the necessary pressure can be applied to get required shapes and mechanical, physical and thermal properties.

The mixture can be placed on or in between support layers which can be placed between rollers or into a mold. Rollers can create any necessary pressure on materials but if necessary, additional pressure can be applied. The choice of support layers or mold depends on the particular application for which the insulation foam or panels is being used. In one embodiment, the support is a material with a surface onto which the above mixture is applied. Examples of supports useful in the method of the present invention include metal sheets, foils, or pipes made from aluminum, copper, steel, and the like; metal screens that are electrically or thermally conductive; paper, cardboard, or fiberboard; ceramics, cements, wood or plywood, woven or nonwoven fiberglass, mat fiberglass, glass, sheetrock, and the like. In one embodiment, the support is a building material such as plywood or sheetrock so that an insulated panel is produced according to the method of the invention. The mold may be any shape appropriate for thermal foam insulation. For example, the mixture can be sandwiched between two support layers or made into a hollow sleeve for application to the outside of pipes, tubes, and the like. The material may also be formed into panels by forming the foam between heated rollers, as known in the art. Electrically or thermally conductive screens or wires may also be embedded in the material, and then activated to generate heat and form the desired foam.

The amount of foam mixture applied to the support or mold according to the method of the invention is largely based on the desired application and degree of foam production or foamed panels for the selected mixture. The mixture that has been applied to support or mold is then heated to produce the thermal insulation foam. The temperature at which the foam or foamed panels are created generally varies depending on factors such as the composition of the above mixture, the method of heat delivery, the nature of the support, the length of time heat is applied, and the like. In general, the heating step preferably takes place in a temperature range from about 100° F. to about 2500° F., more preferably from about 150° F. to about 1800° F., and most preferably from about 200° F. to about 1500° F.

Creation of the insulation foam according to the method of the invention can occur without the application of pressure; however, pressure may be applied during heating of the foam. In some applications, the application of pressure during the formation of the insulation foam improves the physical properties of the foam such as strength. The creation of pressure may be due to the confines of the mold or container as the foam is generated or may be applied externally, for example with a press, heated rollers, and the like. In one embodiment, the foam produced between two layers of support layers can create pressure that improves the foam strength.

The following examples are intended to illustrate, but in no way limit, the scope of the present invention. All parts and percentages are by weight, and temperatures are in degrees Celsius unless explicitly stated otherwise.

| EXAMPLES | |
|---|---|
| Example 1 | |
| Formulation comprised of: | |
| Sodium Silicate, grade RU from The PQ Co | 100 g |
| Aluminosilicate, Zeolex 330 from Huber Co | 20 g |
| Mica | 30 g |
| Sodium Bicarbonate | 6 g |
| Example 2 | |
| Formulation comprised of: | |
| Sodium Silicate, grade RU from The PQ Co | 100 g |
| Sodium Aluminosilicate, Zeolex 330 from Huber Co | 20 g |
| Mica | 30 g |
| Sodium Carbonate | 8 g |
| Example 3 | |
| Formulation comprised of: | |
| Sodium Silicate, grade RU from The PQ Co | 100 g |
| Sodium Aluminosilicate, Zeolex 330 from Huber Co | 20 g |
| Mica | 30 g |
| Sodium Carbonate | 8 g |
| Example 4 | |
| Formulation comprised of: | |
| Sodium Silicate, grade RU from The PQ Co | 100 g |
| Sodium Aluminosilicate, Zeolex 330 from Huber Co | 20 g |
| Glass powder | 20 g |
| Sodium Bicarbonate | 6 g |
| Example 5 | |
| Formulation comprised of: | |
| Sodium Silicate, grade RU from The PQ Co | 100 g |
| Sodium Aluminosilicate, Zeolex 330 from Huber Co | 20 g |
| Mica | 20 g |
| Kaolin, grade 40, Burgess Co | 20 g |
| Sodium Bicarbonate | 8 g |
| Example 6 | |
| Formulation comprised of: | |
| Sodium Silicate, grade N from The PQ Co | 100 g |
| Mica, grade 80 | 40 g |
| Wollastonite, | 40 g |
| This sheet can withstand a temperature of 2000 F | |

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims.

What is claimed is:

1. A method of manufacturing a fire-resistant insulating panel at room temperature resulting in a panel that expands and produces insulating foam in the presence of heat/fire comprising:
   A) mixing at room temperature:
      (I) at least one water-soluble alkali metal silicate selected from the group consisting of sodium silicate, potassium silicate, and combinations thereof;
      (II) at least one chemical selected from the group consisting of silica, mica, talc, microsphere, glass, chopped fibers, sodium aluminosilicate, perlite, zinc oxide, wollastonite, vermiculate, and borax; and
      (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties;
   B) supporting the mixed ingredients at room temperature with at least one support layer;
   C) placing the one or more support layers with the mixed ingredients between rollers to apply pressure at room temperature to form objects selected from the group consisting of panels, sheets, and planar objects which in event of fire/heat will expand to provide thermal protection.

2. A method of manufacturing a fire-resistant insulating panel at room temperature resulting in a panel that expands and produces insulating foam in the presence of heat/fire comprising:
   A) mixing at room temperature:
      (I) at least one water-soluble alkali metal silicate selected from the group consisting of sodium silicate, potassium silicate, and combinations thereof;
      (II) at least one chemical selected from the group consisting of silica, mica, talc, microsphere, glass, chopped fibers, sodium aluminosilicate, perlite, zinc oxide, wollastonite, vermiculate, borax; and
      (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties;
   B) supporting the mixed ingredients at room temperature with at least one support layer;

C) placing the one or more support layer layers with the mixed ingredients in a mold and at room temperature applying pressure whereby a molded object is formed which in event of fire/heat will expand to provide thermal protection.

3. A method of manufacturing a fire-resistant insulating panel at room temperature resulting in a panel that expands and produces insulating foam in the presence of heat/fire comprising:

A) mixing at room temperature:
   (I) at least one water-soluble alkali metal silicate selected from the group consisting of sodium silicate, potassium silicate, and combinations thereof;
   (II) at least one chemical selected from the group consisting of silica, mica, talc, microsphere, glass, chopped fibers, sodium aluminosilicate, perlite, zinc oxide, wollastonite, vermiculate, borax; and
   (III) at least one chemical that is selected from the group comprising: sodium carbonate, sodium bicarbonate, plaster of paris and potassium bicarbonate, which at room temperature(s) interacts with chosen ingredients of (I) and (II), to create the necessary stability and acceleration of interaction processes and desired physical, mechanical and thermal properties;

B) placing the mixed ingredients in a mold and applying pressure at room temperature whereby a molded object is formed which in event of fire/heat will expand to provide thermal protection.

* * * * *